US010923695B2

United States Patent
Ahn et al.

(10) Patent No.: US 10,923,695 B2
(45) Date of Patent: Feb. 16, 2021

(54) BATTERY PACK

(71) Applicant: Samsung SDI Co., Ltd., Yongin-si (KR)

(72) Inventors: Sanghyeok Ahn, Yongin-si (KR); Daehun Lee, Yongin-si (KR); Heonhee Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 15/351,120

(22) Filed: Nov. 14, 2016

(65) Prior Publication Data
US 2017/0244082 A1  Aug. 24, 2017

(30) Foreign Application Priority Data
Feb. 19, 2016 (KR) .................. 10-2016-0019754

(51) Int. Cl.
*H01M 2/12* (2006.01)
*H01M 2/02* (2006.01)
*H01M 10/0525* (2010.01)

(52) U.S. Cl.
CPC ....... *H01M 2/1264* (2013.01); *H01M 2/0237* (2013.01); *H01M 2/1217* (2013.01);
(Continued)

(58) Field of Classification Search
CPC .... H01M 2/12; H01M 2/1217; H01M 2/1223; H01M 2/1229; H01M 2/1276; H01M 2/1205; H01M 10/52
See application file for complete search history.

(56) References Cited

U.S. PATENT DOCUMENTS 5,407,760 A * 4/1995 Kasner ................ H01M 2/1205
429/54
5,538,807 A * 7/1996 Hagiuda ............. H01M 2/1016
429/100
(Continued)

FOREIGN PATENT DOCUMENTS

CN 1168542 A 12/1997
CN 203277539 U 11/2013
(Continued)

OTHER PUBLICATIONS

EPO Extended Search Report dated May 10, 2017, for corresponding European Patent Application No. 17150065.5 (13 pages).
(Continued)

*Primary Examiner* — Christina Chern
(74) *Attorney, Agent, or Firm* — Lewis Roca Rothgerber Christie LLP

(57) ABSTRACT

A battery pack includes a housing accommodating a battery cell and having a throughhole; and a pressure equalization device coupled to the throughhole and equalizing internal and external pressures of the housing, wherein the pressure equalization device includes a first pressure equalization member configured to equalize the internal and external pressures of the housing when a variation in the internal pressure of the housing is smaller than a reference pressure variation; and a second pressure equalization member configured to equalize the internal and external pressures of the housing when the variation in the internal pressure of the housing is greater than the reference pressure variation.

10 Claims, 10 Drawing Sheets

(52) U.S. Cl.
CPC ....... *H01M 2/1229* (2013.01); *H01M 2/1276* (2013.01); *H01M 10/0525* (2013.01); *H01M 2200/20* (2013.01); *H01M 2220/20* (2013.01)

(56) References Cited

U.S. PATENT DOCUMENTS

| | | | |
|---|---|---|---|
| 5,554,455 | A | 9/1996 | Inoue et al. |
| 6,294,282 | B1 * | 9/2001 | Misra .................... H01M 10/52 429/54 |
| 2013/0098912 | A1 | 4/2013 | Scagliarini et al. |
| 2014/0120387 | A1 | 5/2014 | Kinuta et al. |
| 2017/0018748 | A1 * | 1/2017 | Matsuura ............ H01M 2/1276 |

FOREIGN PATENT DOCUMENTS

| | | |
|---|---|---|
| DE | 10-2013-213909 A1 | 1/2015 |
| EP | 0504573 A1 | 9/1992 |
| EP | 0692829 A1 | 1/1996 |
| JP | 2008-293293 A | 12/2008 |
| KR | 10-2014-0147546 A | 12/2014 |
| KR | 10-2015-0031611 A | 3/2015 |

OTHER PUBLICATIONS

Chinese Office Action dated Nov. 4, 2020, issued in corresponding Chinese Patent Application No. 201611203851.1 (8 pages).

* cited by examiner

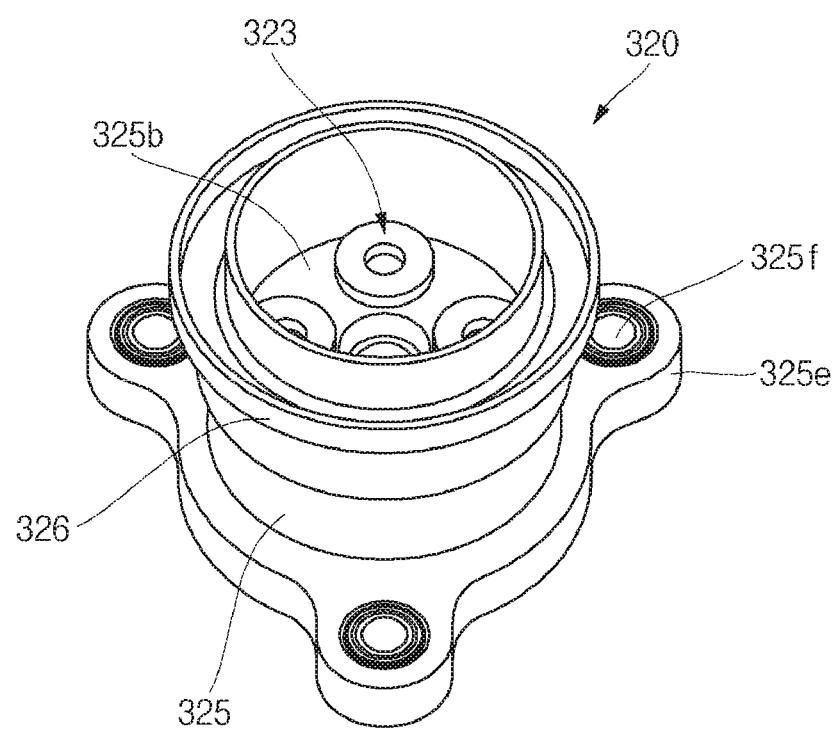

BATTERY PACK

CROSS-REFERENCE TO RELATED APPLICATION

This application claims priority to and the benefit of Korean Patent Application No. 10-2016-0019754 filed on Feb. 19, 2016 in the Korean Intellectual Property Office, and all the benefits accruing therefrom under 35 U.S.C. 119, the entire content of which is incorporated herein by reference.

BACKGROUND

1. Field

The present invention relates to a battery pack.

2. Description of the Related Art

In general, a battery pack includes a battery cell, a circuit module and a case. Recently, lithium ion secondary batteries are widely used because they have a high operating voltage and a high energy density per unit weight. In addition, the battery pack is widely used for power sources of hybrid cars and or electric cars as well as portable electronic appliances.

The above information disclosed in this Background section is only for enhancement of understanding of the background of the described technology and therefore it may contain information that does not form the prior art that is already known in this country to a person of ordinary skill in the art.

SUMMARY

Embodiments of the present invention provide a battery pack, which includes an ambient pressure equalization device (APED) maintaining an internal pressure and an external pressure at an equalized level, and an extreme pressure equalization device (EPED) rapidly releasing an extreme pressure and gases generated in the battery pack to the outside.

The above and other aspects of the present invention will be described in or be apparent from the following description of exemplary embodiments.

According to an aspect of the present invention, there is provided a battery pack including a housing accommodating a battery cell and having a throughhole, and a pressure equalization device coupled to the throughhole and equalizing internal and external pressures of the housing, wherein the pressure equalization device includes a first pressure equalization member for equalizing the internal and external pressures of the housing when a variation in the internal pressure of the housing is smaller than a reference pressure variation, and a second pressure equalization member for equalizing the internal and external pressures of the housing when the variation in the internal pressure of the housing is greater than the reference pressure variation.

The first pressure equalization member and the second pressure equalization member may be integrally formed with each other or may be separately formed and coupled together.

The pressure equalization device may include an inner body connected to the throughhole and an elastic member positioned inside the inner body, wherein the first pressure equalization member may be positioned between the inner body and the elastic member and the second pressure equalization device extending from the first pressure equalization member to be coupled to the elastic member.

When the variation in the internal pressure of the housing is smaller than the reference pressure variation, the first pressure equalization member may close the throughhole, and when the variation in the internal pressure of the housing is greater than the reference pressure variation, the second pressure equalization member may open the throughhole.

The first pressure equalization member may be made of an air permeable material.

The inner body may be coupled to an outer body.

The first pressure equalization member and the second pressure equalization member may be separately formed from each other.

The pressure equalization device may include an outer body, a connection plate extending to the inside of the outer body and an upper protrusion upwardly extending from the connection plate and connected to the throughhole, the first pressure equalization member may be coupled to the connection plate, and the second pressure equalization member may be coupled to the upper protrusion.

The battery pack may further include an inner body coupled to the upper protrusion and connected to the throughhole, and an elastic member positioned inside the inner body, wherein the second pressure equalization member is coupled between the inner body and the elastic member.

When the variation in the internal pressure of the housing is smaller than the reference pressure variation, the first and second pressure equalization members may close the throughhole, and when the variation in the internal pressure of the housing is greater than the reference pressure variation, the second pressure equalization member may open the throughhole.

As described above, the battery pack according to an embodiment of the present invention includes an ambient pressure equalization device (APED) maintaining an internal pressure and an external pressure at an equalized level, and an extreme pressure equalization device (EPED) rapidly releasing an extreme pressure and gases generated in the battery pack to the outside.

In other words, according to embodiments of the present invention, when a variation in the internal pressure of the housing accommodating a battery cell is smaller than a reference pressure variation, the ambient pressure equalization device equalizes internal and external pressures of the housing, and when the variation in the internal pressure of the housing is greater than the reference pressure variation, the extreme pressure equalization member equalizes the internal and external pressures of the housing. In other words, the ambient pressure equalization device equalizes the internal and external pressures of the housing in a state in which the throughhole of the housing is not opened, and the extreme pressure equalization device equalizes the internal and external pressures of the housing in a state in which the throughhole of the housing is opened.

Therefore, when the variation in the internal pressure of the housing accommodating a battery cell is smaller than the reference pressure variation, airtightness is maintained so that the internal and external pressures of the housing are equalized while preventing external foreign materials from penetrating into the housing, and when the variation in the internal pressure of the housing is greater than the reference pressure variation, the throughhole of the housing is opened so that excess internal pressure and gases of the housing are rapidly released to the outside.

In addition, according to the present invention, the ambient pressure equalization device and the extreme pressure equalization device are integrally formed with each other or separately formed from each other in a structure, thereby allowing the ambient pressure equalization device and the extreme pressure equalization device to be easily coupled to the housing of the battery pack.

BRIEF DESCRIPTION OF THE DRAWINGS

The above and other features of the present invention will become more apparent by describing in detail exemplary embodiments thereof with reference to the attached drawings in which:

FIGS. 5A, 5B and 5C are an upper perspective view, a lower perspective view and a cross-sectional view of a pressure equalization device of a battery pack according to still another embodiment of the present invention.

DETAILED DESCRIPTION

Figure 1A:
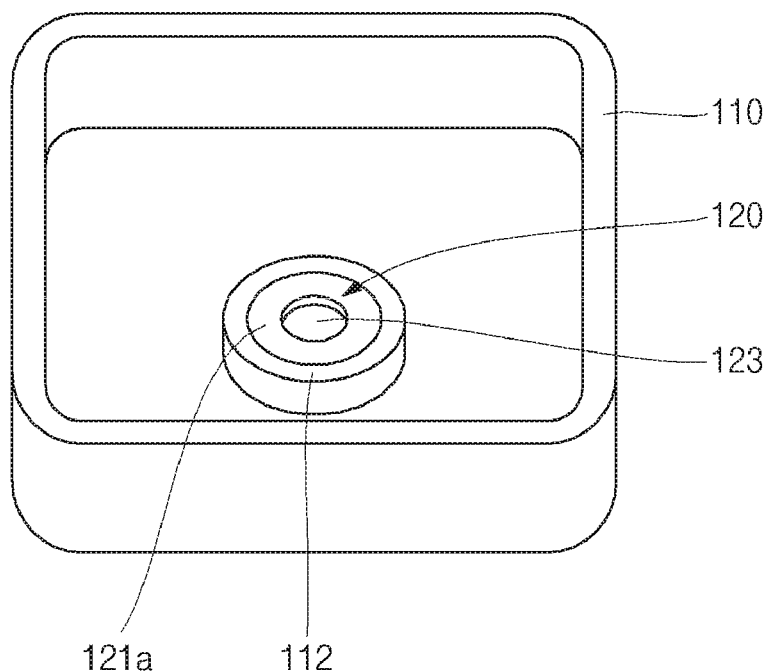
FIGS. 1A and 1B are a perspective view and a cross-sectional view of a pressure equalization device of a battery pack according to an embodiment of the present invention.

Hereinafter, examples of embodiments of the invention will be described in detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the drawings, the thickness of layers and regions are exaggerated for clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B, or an intervening element C may be present between the elements A and B so that the element A can be indirectly connected to the element B.

In addition, the terminology used herein is for the purpose of describing particular embodiments only and is not intended to be limiting thereof. As used herein, the singular forms are intended to include the plural forms as well, unless the context clearly indicates otherwise. It will be further understood that the terms "comprise" or "include" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

In addition, the term "first pressure equalization device or ambient pressure equalization device" used herein means a device that equalizes internal and external pressures of the battery pack for a relatively small change in the pressure, and the term "second pressure equalization member or extreme pressure equalization device" used herein means a device that equalizes internal and external pressures of the battery pack by rapidly releasing the internal pressure and gases generated in the battery pack to the outside when amounts of the internal pressure and gases generated in the battery pack are relatively large.

In addition, the term "housing" used herein means a case, a can or a container capable of accommodating at least one battery cell or battery module or an electrode assembly in some instances. Moreover, the housing may be directly mounted in an electrically driven tool, an electric bicycle, an electric motor cycle, or an electric car.

Figure 1B:
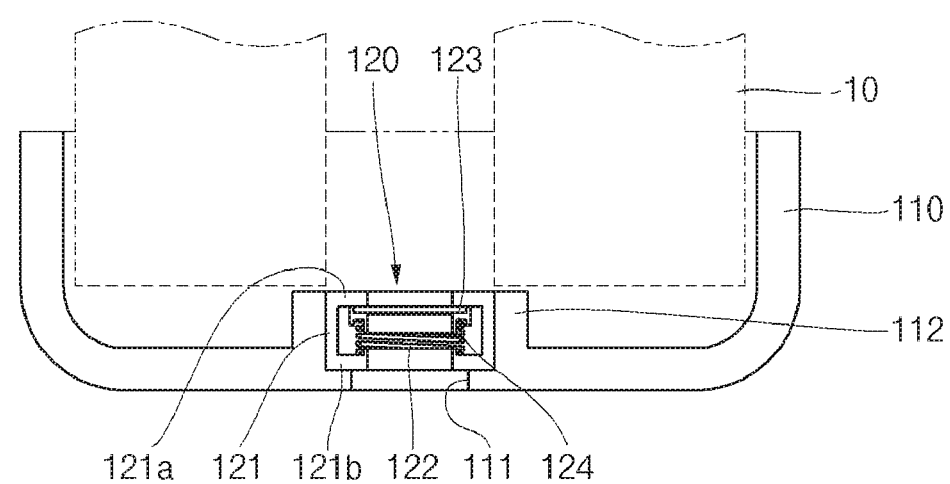

Referring to FIGS. 1A and 1B, a perspective view and a cross-sectional view of a pressure equalization device (120) of a battery pack (100) according to an embodiment of the present invention are illustrated.

As illustrated in FIGS. 1A and 1B, the battery pack 100 according to an embodiment of the present invention includes a housing 110 and a pressure equalization device 120.

The housing 110 is made of one material selected from plastic, steel and equivalents thereof. At least one battery cell, a battery module or an electrode assembly 10 may be mounted in the housing 110. In addition, the housing 110 further includes at least one throughhole 111 formed in its bottom portion. In some instances, a protrusion 112 may further be formed around the throughhole 111.

The pressure equalization device 120 is coupled to the throughhole 111 of the housing 110 and equalizes the internal and external pressures of the housing 110. To this end, the pressure equalization device 120 includes an inner body 121, an elastic member 122, a first pressure equalization member 123 and a second pressure equalization member 124. In one embodiment, the first pressure equalization member 123 and the second pressure equalization member 124 may be integrally formed. For example, the first and second pressure equalization members 123 and 124 may be integrally formed by injection molding.

The inner body 121 is coupled to the throughhole 111 of the housing 110 and is shaped to have a hollow internal space penetrating downwardly in a vertical direction. In other words, the inner body 121 is connected to the throughhole 111. In the inner body 121, the internal inner diameter is largest and the top and bottom inner diameters are relatively small. In other words, the inner body 121 includes an upper flange 121a and a lower flange 121b formed at top and bottom portions of the inner body 121.

The elastic member 122 is positioned inside the inner body 121. In other words, the elastic member 122 may be positioned on the lower flange 121b. The elastic member 122 may be formed of a spring and an equivalent thereof, but aspects of the present invention are not limited thereto.

The first pressure equalization member 123 is positioned between the inner body 121 and the elastic member 122. In other words, the first pressure equalization member 123 may be positioned between the upper flange 121a of the inner body 121 and the elastic member 122. The first pressure equalization member 123 may be made of an air permeable material. In some instances, the first pressure equalization member 123 may be made of a material that can be rapidly melted by hot air. The first pressure equalization member 123 may have a melting point of, for example, approximately 100° C. to approximately 200° C. and may be made of a material having permeability, which is selected from the group consisting of polyethylene, polypropylene, low-density polyethylene, high-density polyethylene, linear low-density polyethylene and equivalents thereof. In addition, the first pressure equalization member 123 may have a thickness in a range of, for example, approximately 1 μm to approximately 1000 μm, according to application fields.

As described above, when the variation in the internal pressure of the housing 110 is smaller than the reference pressure variation, the first pressure equalization member 123 comes into close contact with the upper flange 121a of the inner body 121 by elasticity of the elastic member 122, thereby ultimately closing the throughhole 111 of the housing 110. Therefore, when the variation in the internal pressure of the housing 110 is smaller than the reference pressure variation, the first pressure equalization member 123 allows the air to permeate, thereby equalizing the internal and external pressures of the housing 110.

Here, the term "reference pressure" may have substantially the same meaning with "elasticity" of the elastic member 122 compressed inside the inner body 121. Therefore, the elasticity of the elastic member 122 is adjusted, thereby ultimately adjusting the reference pressure variation. In other words, the maximum value of the reference pressure variation may be elasticity of the compressed elastic member 122.

In one embodiment, the second pressure equalization member 124 extends downwardly from the first pressure equalization member 123 to be coupled to the elastic member 122. In other words, the second pressure equalization member 124 is shaped of a hollow cylinder to be coupled to the elastic member 122 while not being brought into contact with the lower flange 121b of the inner body 121. In practice, the first pressure equalization member 123 in the form of a foil or a film may be formed at the center of the second pressure equalization member 124. In other words, the first pressure equalization member 123 and the second pressure equalization member 124 are integrally formed. However, the second pressure equalization member 124 may be formed more thickly than the first pressure equalization member 123 or may be made of a flame-resistant material so as to prevent the second pressure equalization member 124 from being melted even if the first pressure equalization member 123 is melted by hot air. The inner body 121 surrounding the first and second pressure equalization members 123 and 124 may also be made of a flame-resistant material.

As described above, when the variation in the internal pressure of the housing 110 is greater than the reference pressure variation, the second pressure equalization member 124 downwardly pushes the elastic member 122 to move from the top portion to the bottom portion of the inner body 121, thereby opening the throughhole 111 of the housing 110 and equalizing the internal and external pressures of the housing 110.

In such a manner, the excessively high pressure and gases generated in the housing 110 are rapidly released to the outside. In addition, if the variation in the internal pressure of the housing 110 becomes smaller than the reference pressure variation, the second pressure equalization member 124 moves from the bottom portion to the top portion of the inner body 121 by elasticity or restoring force of the elastic member 122, thereby closing the throughhole 111 of the housing 110 by the first pressure equalization member 123 and/or the second pressure equalization member 124. Therefore, external foreign materials may not penetrate into the housing 110 and airtightness of the housing 110 can be maintained.

Figure 2A:
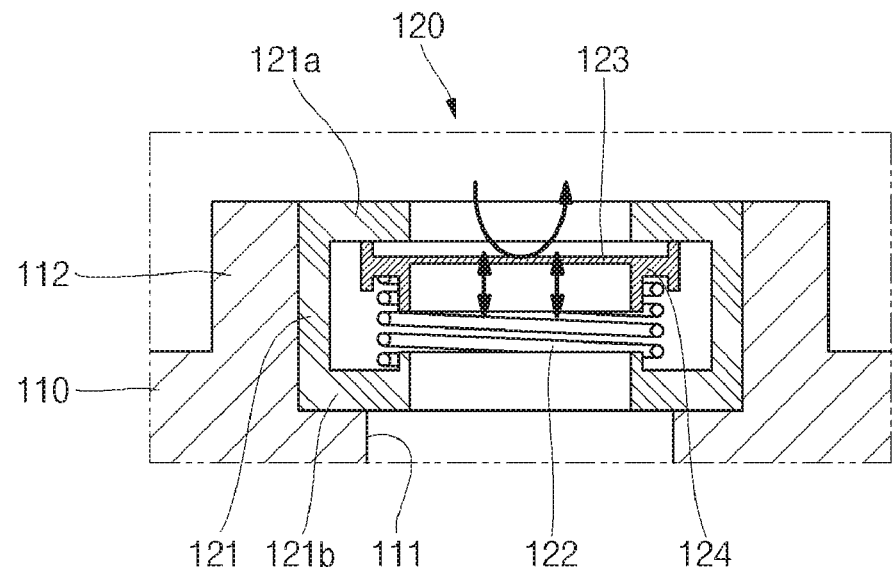
FIGS. 2A and 2B are enlarged cross-sectional views illustrating operations of an ambient pressure equalization device and an extreme pressure equalization device of the battery pack according to an embodiment of the present invention.
Figure 2B:
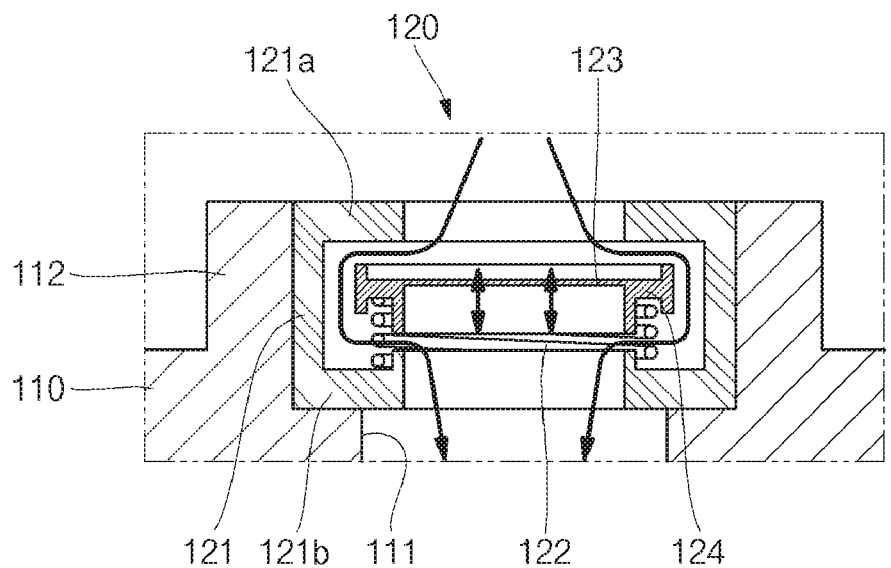

Referring to FIGS. 2A and 2B, operations of the ambient pressure equalization device 123 and the extreme pressure equalization device 124 of the battery pack 100 according to an embodiment of the present invention are illustrated.

As illustrated in FIG. 2A, when the variation in the internal pressure of the housing 110 is smaller than the reference pressure variation (that is, when the internal pressure of the housing 110 is smaller than the elasticity of the elastic member 122), the first pressure equalization member 123 equalizes the internal and external pressures of the housing 110. In other words, while the first pressure equalization member 123 closes the throughhole 111 of the housing 110, the air can permeate through the first pressure equalization member 123, thereby equalizing the internal and external pressures of the housing 110. Such states can be defined as a state in which the first pressure equalization member 123 is turned on and a state in which the second pressure equalization member 124 is turned off.

As illustrated in FIG. 2B, when the variation in the internal pressure of the housing 110 is greater than the reference pressure variation (that is, when the internal pressure of the housing 110 is greater than the elasticity of the elastic member 122), the second pressure equalization member 124 equalizes the internal and external pressures of the housing 110. In other words, the first pressure equalization member 123 and the second pressure equalization member 124 integrally formed with each other downwardly moves while compressing the elastic member 122 by the internal pressure of the housing 110, thereby opening the throughhole 111 of the housing 110. Therefore, the excessively high pressure and gases generated in the housing 110 are rapidly released to the outside through the throughhole 111 and the inner body 121. Such states can be defined as a state in which the first pressure equalization member 123 and the second pressure equalization member 124 are both turned on.

As described above, the pressure equalization device 120 of the battery pack 100 according to an embodiment of the present invention is implemented as a single device from the first pressure equalization member 123 and the second pressure equalization member 124, thereby dealing with both a low pressure and a high pressure. In other words, the low pressure is dealt with the first pressure equalization member 123 and the high pressure is dealt with the second pressure equalization member 124. In addition, according to the present invention, since the first pressure equalization member 123 is integrally formed in the second pressure equalization member 124 and is incorporated into the inner body 121, the overall volume of the pressure equalization device 120 is reduced, thereby allowing the pressure equalization device 120 to be easily coupled to the throughhole 111 of the housing 110.

Figure 3A:
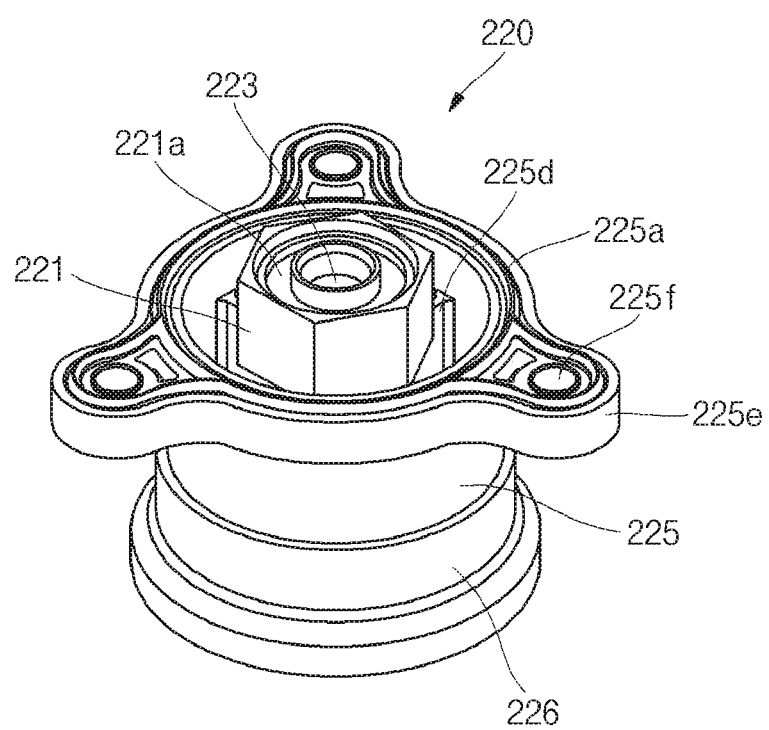
FIGS. 3A, 3B and 3C are an upper perspective view, a lower perspective view and a cross-sectional view of a pressure equalization device of a battery pack according to another embodiment of the present invention.
Figure 3B:
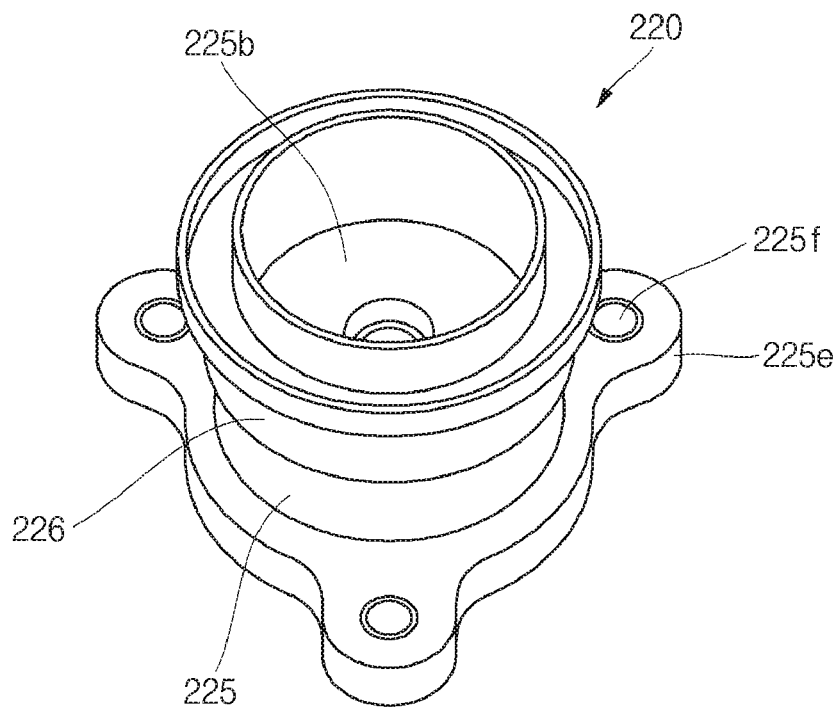
Figure 3C:
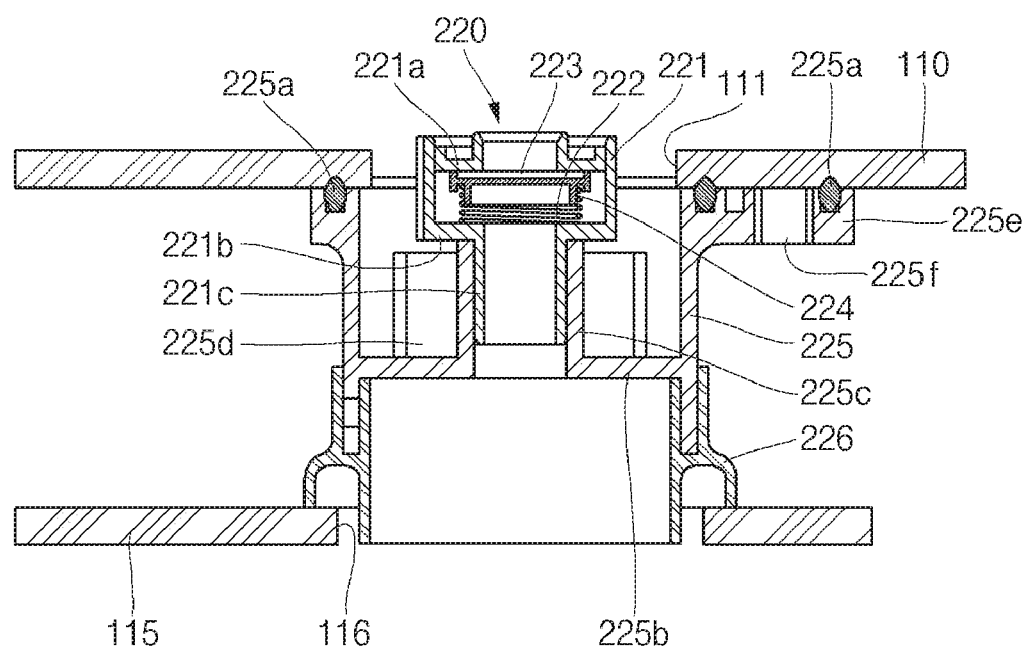

Referring to FIGS. 3A, 3B and 3C, an upper perspective view, a lower perspective view and a cross-sectional view of a pressure equalization device (220) of a battery pack according to another embodiment of the present invention are illustrated.

As illustrated in FIGS. 3A, 3B and 3C, the pressure equalization device 220 of the battery pack according to another embodiment of the present invention may be installed, for example, between the housing 110 of the battery pack and a vehicle chassis 115. Here, the housing 110 and the vehicle chassis 115 may have throughholes 111 and 116, respectively.

The pressure equalization device 220 is positioned between the throughhole 111 of the housing 110 and the throughhole 116 of the vehicle chassis 115 and equalizes an internal pressure of the housing 110 and an external pressure of a vehicle.

To this end, the pressure equalization device 220 includes an inner body 221, an elastic member 222, a first pressure equalization member 223 and a second pressure equalization member 224. In one embodiment, the first pressure equalization member 223 and the second pressure equalization member 224 may be integrally formed.

Moreover, the pressure equalization device 220 includes an outer body 225 coupled to the throughhole 111 of the housing 110 and a tube 226 positioned in the throughhole 116 of the vehicle chassis 115. In one embodiment, the tube 226 may be coupled to a bottom end of the outer body 225.

The inner body 221 is positioned in the throughhole 111 of the housing 110 and is shaped of a hollow internal space penetrating downwardly in a vertical direction to then be connected to the throughhole 111. In the inner body 221, the internal inner diameter is largest and the top and bottom inner diameters are relatively small. In other words, the inner body 221 includes an upper flange 221a separately formed at a top portion of the inner body 221, a lower flange 221b integrally formed at a bottom portion of the inner body 221, and a lower protrusion 221c downwardly extending from the lower flange 221b.

The elastic member 222 is positioned inside the inner body 221. In other words, the elastic member 222 may be positioned on the lower flange 221b.

The first pressure equalization member 223 is positioned between the upper flange 221a and the elastic member 222. The first pressure equalization member 223 may be made of an air permeable material. In some instances, the first pressure equalization member 223 may be made of a material that can be rapidly melted by hot air.

Therefore, when the variation in the internal pressure of the housing 110 is smaller than the reference pressure variation, the first pressure equalization member 223 comes into close contact with the upper flange 221a, thereby ultimately closing the throughhole 111 of the housing 110. Therefore, when the variation in the internal pressure of the housing 110 is smaller than the reference pressure variation, the air can permeate through the first pressure equalization member 223, thereby equalizing the internal and external pressures of the housing 110.

The second pressure equalization member 224 extends downwardly from the first pressure equalization member 223 to be coupled to the elastic member 222. In other words, the second pressure equalization member 224 is shaped of a hollow cylinder to be coupled to the elastic member 222 while not being brought into contact with the lower flange 221b of the inner body 221. In practice, the first pressure equalization member 223 in the form of a foil or a film may be formed at the center of the second pressure equalization member 224. In other words, the first pressure equalization member 223 and the second pressure equalization member 224 may be integrally formed. However, the second pressure equalization member 224 may be formed more thickly than the first pressure equalization member 223 or may be made of a flame-resistant material so as to prevent the second pressure equalization member 224 from being melted even if the first pressure equalization member 223 is melted by hot air.

The outer body 225 is shaped to penetrate downwardly in a vertical direction. As described above, the outer body 225 may be coupled to the throughhole 111 of the housing 110 to then be connected thereto. In one embodiment, a gasket 225a may be located between the outer body 225 and the housing 110, thereby securing airtightness of the housing 110.

The outer body 225 includes a centrally extending connection plate 225b and an upper protrusion 225c upwardly extending from the connection plate 225b and having a hollow internal space. In one embodiment, the upper protrusion 225c may be connected to the throughhole 111 through the lower protrusion 221c and the inner body 221. In addition, a plurality of reinforcement barriers 225d may further be formed between the upper protrusion 225c and the outer body 225. The reinforcement barriers 225d maintain centrality of the upper protrusion 225c so as to prevent the upper protrusion 225c from moving inside the outer body 225 in all directions.

Moreover, the outer body 225 further includes an outer flange 225e having a coupling hole 225f to be coupled to the housing 110. A bolt, etc. may be coupled to the coupling hole 225f of the outer flange 225e, thereby allowing the outer body 225 to be coupled to the housing 110.

The outer body 225 may be made of, for example, one selected from plastic, steel and equivalents thereof, but aspects of the present invention are not limited thereto.

The tube 226 may be coupled to a bottom end of the outer body 225 and comes into close contact with a vehicle body 115, so that external foreign materials may not penetrate into the vehicle body 115.

In addition, the tube 226 may be made of, for example, one selected from rubber and an equivalent thereof, but aspects of the present invention are not limited thereto.

In one embodiment, the lower protrusion 221c of the inner body 221 is coupled to the upper protrusion 225c of the outer body 225. Therefore, the first pressure equalization member 223 and the second pressure equalization member 224, which are provided inside the inner body 221, are shaped to substantially close the throughhole 111 of the housing 110.

As described above, when the variation in the internal pressure of the housing 110 is greater than the reference pressure variation, the second pressure equalization member 224 downwardly pushes the elastic member 222 to move downwardly inside the inner body 221, thereby opening the throughhole 111 of the housing 110 and equalizing the internal and external pressures of the housing 110.

As described above, internal gases of the housing 110 are rapidly released to the outside. In addition, if the variation in the internal pressure of the housing 110 becomes smaller than the reference pressure variation, the second pressure equalization member 224 moves from the bottom portion to the top portion of the inner body 221 by elasticity or restoring force of the elastic member 222, thereby closing the throughhole 111 of the housing 110 by the first pressure equalization member 223 and/or the second pressure equalization member 224. Therefore, external foreign materials may not penetrate into the housing 110 and airtightness of the housing 110 can be maintained.

Figure 4A:
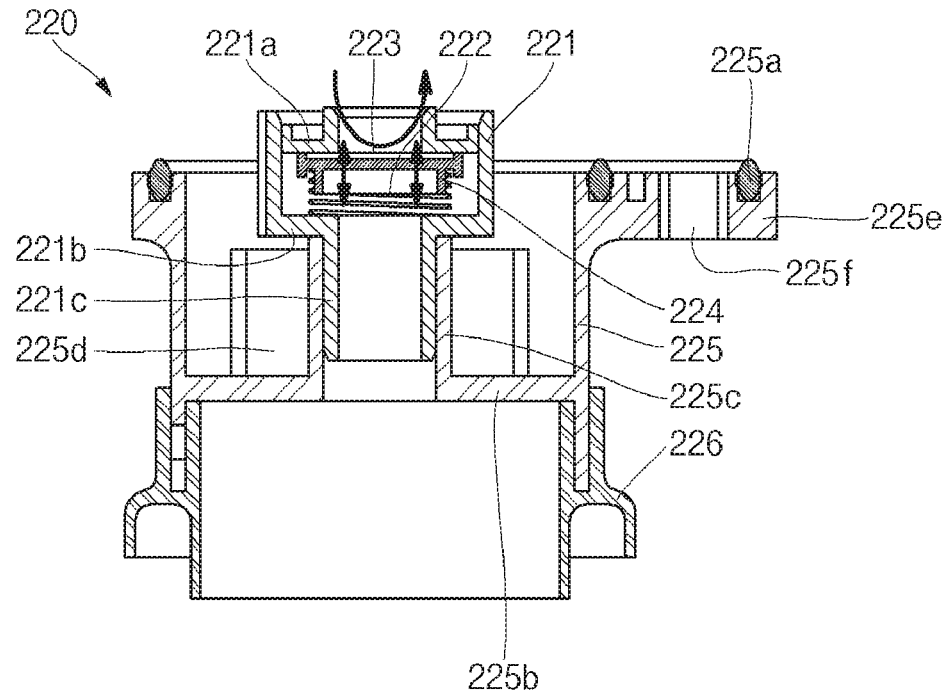
FIGS. 4A and 4B are cross-sectional views illustrating operations of an ambient pressure equalization device and an extreme pressure equalization device of the battery pack according to another embodiment of the present invention.
Figure 4B:
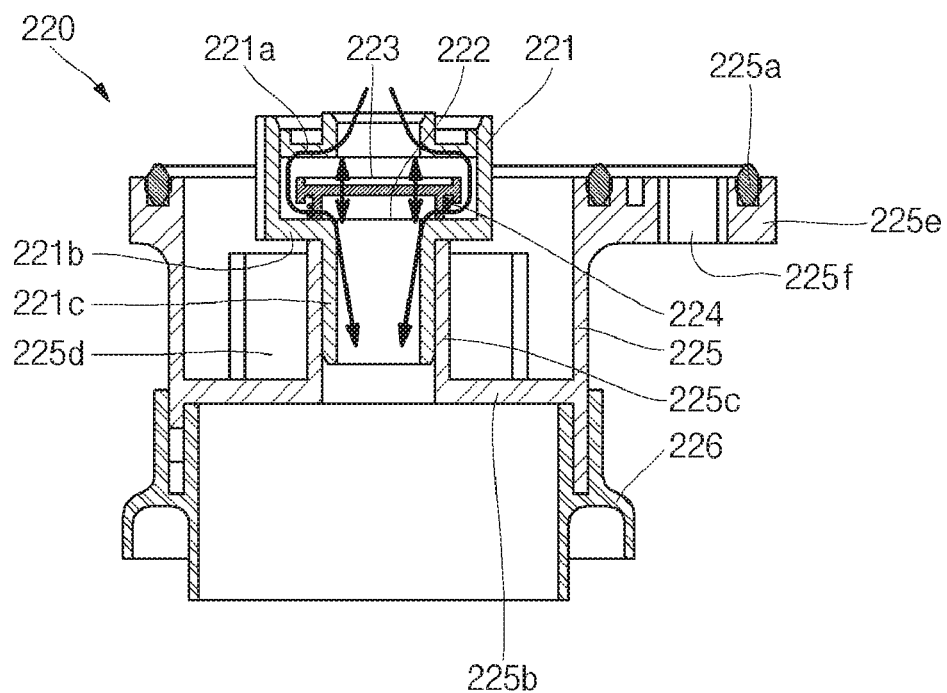

Referring to FIGS. 4A and 4B, operations of the ambient pressure equalization device 223 and the extreme pressure equalization device 224 of the battery pack according to another embodiment of the present invention are illustrated.

As illustrated in FIG. 4A, when the variation in the internal pressure of the housing 110 is smaller than the reference pressure variation (that is, when the internal pressure of the housing 110 is smaller than the elasticity of the elastic member 222), the first pressure equalization member 223 equalizes the internal and external pressures of the housing 110 by allowing the first pressure equalization member 223 to close the upper flange 221a of the inner body 221. In other words, while the first pressure equalization member 223 closes the throughhole 111 of the housing 110, the air can permeate through the first pressure equalization member 223, thereby equalizing the internal and external pressures of the housing 110.

As illustrated in FIG. 4B, when the variation in the internal pressure of the housing 110 is greater than the reference pressure variation (that is, when the internal pressure of the housing 110 is greater than the elasticity of the elastic member 222), the second pressure equalization member 224 equalizes the internal and external pressures of the housing 110. In other words, the first pressure equalization member 223 and the second pressure equalization member 224 integrally formed with each other downwardly move while compressing the elastic member 222 by the internal pressure of the housing 110, thereby opening the throughhole 111 of the housing 110. In one embodiment, the throughhole 111 of the housing 110, the lower protrusion 221c of the inner body 221 and the upper protrusion 225c of the outer body 225 are connected to one another.

Therefore, the excessively high pressure and gases generated in the housing 110 are rapidly released to the outside through the throughhole 111, the inner body 121 and the outer body 225.

As described above, the pressure equalization device 220 of the battery pack according to another embodiment of the present invention is implemented as a single device from the first pressure equalization member 223 and the second pressure equalization member 224, thereby dealing with both a low pressure and a high pressure. In other words, the low pressure is dealt with the first pressure equalization member 223 and the high pressure is dealt with the second pressure equalization member 224. In addition, according to the present invention, since the first pressure equalization member 223 is integrally formed in the second pressure equalization member 224 and the inner body 221 incorporating the first pressure equalization member 223 is coupled to the inside of the outer body 225, thereby allowing the pressure equalization device 220 to be easily coupled to the housing 110.

Figure 5A:
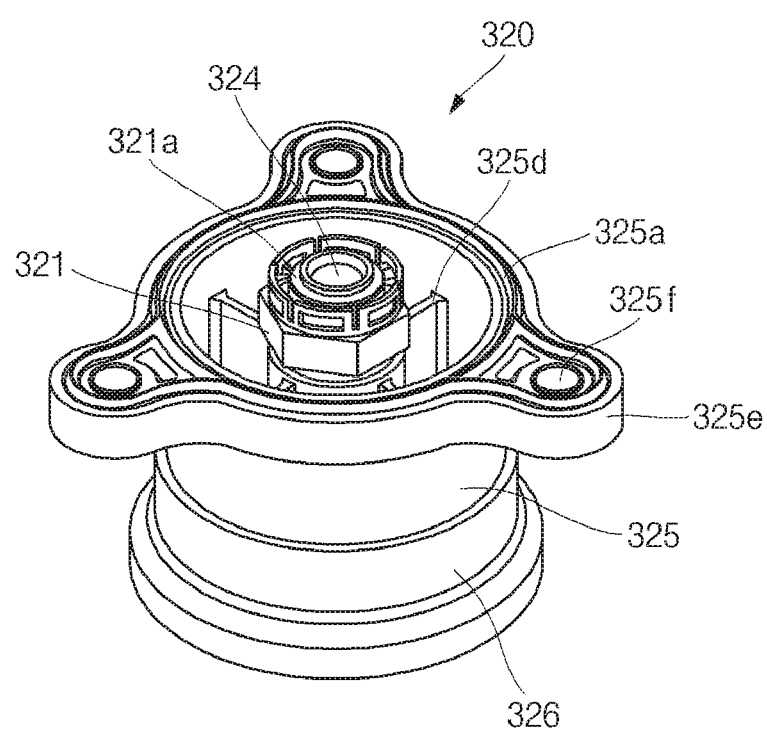
Figure 5C:
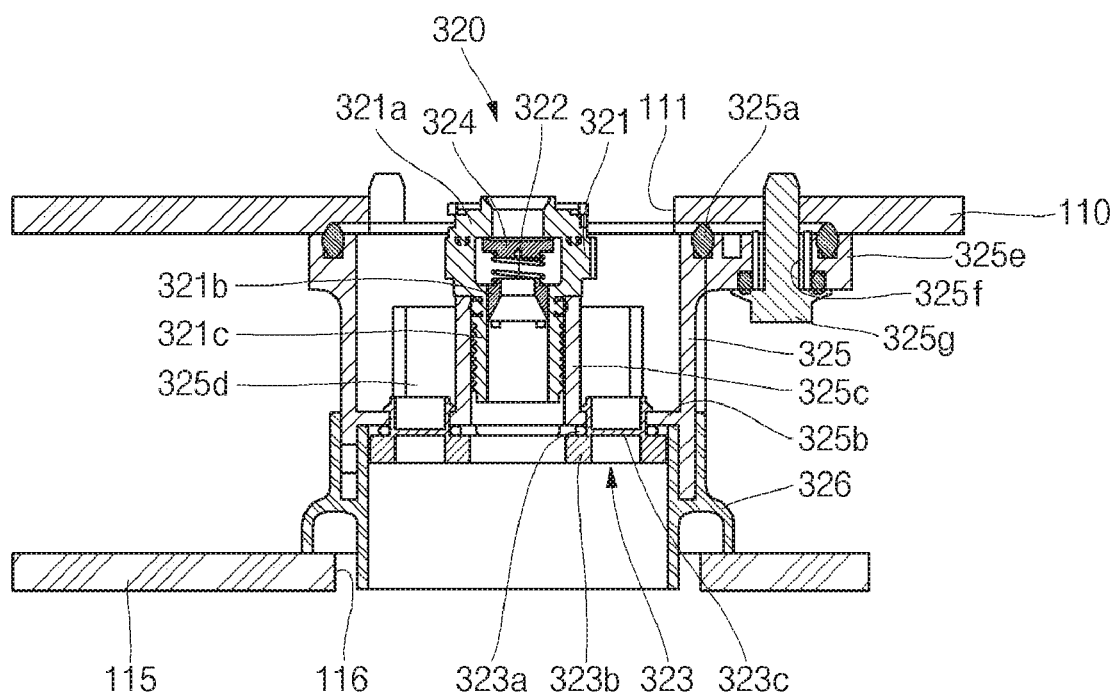

Referring to FIGS. 5A, 5B and 5C, an upper perspective view, a lower perspective view and a cross-sectional view of a pressure equalization device 320 of a battery pack according to still another embodiment of the present invention are illustrated.

As illustrated in FIGS. 5A, 5B and 5C, the pressure equalization device 320 of the battery pack according to still another embodiment of the present invention is basically constructed such that a first pressure equalization member 323 and a second pressure equalization member 324 are separately formed. In detail, the first pressure equalization member 323 is coupled to an outer body 325 and the second pressure equalization member 324 is coupled to an inner body 321, so that the first and second pressure equalization members 323 and 324 are formed at different regions.

In more detail, the pressure equalization device 320 of the battery pack according to still another embodiment of the present invention includes the outer body 325, the first pressure equalization member 323, the inner body 321, an elastic member 322, and the second pressure equalization member 324. In one embodiment, a tube 326 may be coupled to the outer body 325.

The outer body 325 is shaped to penetrate downwardly in a vertical direction. As described above, the outer body 325 may be coupled to the throughhole 111 of the housing 110 to then be connected thereto. In addition, a gasket 225a may be located between the outer body 225 and the housing 110, thereby securing airtightness between the outer body 325 and the housing 110. The outer body 325 includes a centrally extending connection plate 325b and an upper protrusion 325c upwardly extending from the connection plate 325b and connected to the throughhole 111. In addition, a plurality of reinforcement barriers 325d may further be formed between the upper protrusion 325c and the outer body 325. Moreover, the outer body 325 further includes an outer flange 225e having a coupling hole 325f to be coupled to the housing 110. A bolt 325g may be coupled to the coupling hole 325f of the outer flange 325e and the housing 110, thereby allowing the outer body 325 to be coupled to the housing 110.

The first pressure equalization member 323 is coupled to the connection plate 325b. In particular, a plurality of first pressure equalization members 323 may be coupled to the connection plate 325b. Moreover, a gasket 323a may further be coupled between the first pressure equalization member 323 and the connection plate 325b to improve airtightness therebetween.

In more detail, the first pressure equalization member 323 includes a cylindrical body 323b coupled thereto while penetrating the connection plate 325b, and an equalization member 323c closing the body 323b while traversing the body 323b. In one embodiment, the equalization member 323c may be made of the same material with and may be formed to the same thickness with the first pressure equalization members 123 and 223 shown in FIGS. 1B and 3C. In addition, the top outer diameter of the body 323b is smaller than the bottom outer diameter of the body 323b so as to allow the body 323b to be coupled to the connection plate 325b upwardly in a vertical direction. In particular, since the top section of the body 323b is substantially arrow-shaped, the body 323b is not disconnected from the connection plate 325b once it is coupled to the connection plate 325b.

As described above, when the variation in the internal pressure of the housing is smaller than the reference pressure variation, the first pressure equalization member 323 coupled to the connection plate 325b of the outer body 325 allows only the air to permeate, thereby equalizing the internal pressure of the housing 110 and the external pressure of the vehicle.

The tube 326 may be coupled to a bottom end of the outer body 325 and comes into close contact with a vehicle body 115, so that external foreign materials may not penetrate into the vehicle body 115.

The inner body 321 is coupled to the throughhole 111 of the housing 110 and is shaped to have a hollow internal space penetrating downwardly in a vertical direction to then be connected to the throughhole 111. In the inner body 321, the internal inner diameter is largest and the top and bottom inner diameters are relatively small. In other words, the inner body 321 includes an upper flange 321a, a lower flange 321b separately formed at the bottom portion of the inner body 321 and a lower protrusion 321c downwardly extending to be coupled to an upper protrusion 325c. In one embodiment, the lower protrusion 321c of the inner body 321 and the upper protrusion 325c of the outer body 325 are coupled and connected to each other. In addition, a gasket may be located between the inner body 321 and the upper protrusion 325c, thereby securing airtightness between the inner body 321 and the upper protrusion 325c of the housing 110.

The elastic member 322 is positioned inside the inner body 321. In other words, the elastic member 322 may be positioned on the lower flange 321b coupled to the inner body 321.

The second pressure equalization member 324 is positioned between the upper flange 321a of the inner body 321 and the elastic member 322. In other words, the second pressure equalization member 324 is coupled to the elastic member 322 while not being brought into contact with the lower flange 321b of the inner body 321. As described above, the first pressure equalization member 323 provided in the connection plate 325b of the outer body 325 and the second pressure equalization member 324 provided inside the inner body 321 are configured to substantially close the throughhole 111 of the housing 110.

As described above, when the variation in the internal pressure of the housing 110 is greater than the reference pressure variation, the second pressure equalization member 324 downwardly pushes the elastic member 322 to move from the top portion to the bottom portion of the inner body 321, thereby opening the throughhole 111 of the housing 110 and equalizing the internal and external pressure of the housing 110 and the external pressure of the vehicle.

In such a manner, internal gases generated in the housing 110 are rapidly released to the outside. In addition, if the variation in the internal pressure of the housing 110 becomes smaller than the reference pressure variation, the second pressure equalization member 324 moves from the bottom portion to the top portion of the inner body 321 by elasticity or restoring force of the elastic member 322, thereby closing the throughhole 111 of the housing 110 by the second pressure equalization member 324. Therefore, external foreign materials may not penetrate into the housing 110 and airtightness of the housing 110 can be maintained.

Figure 6A:
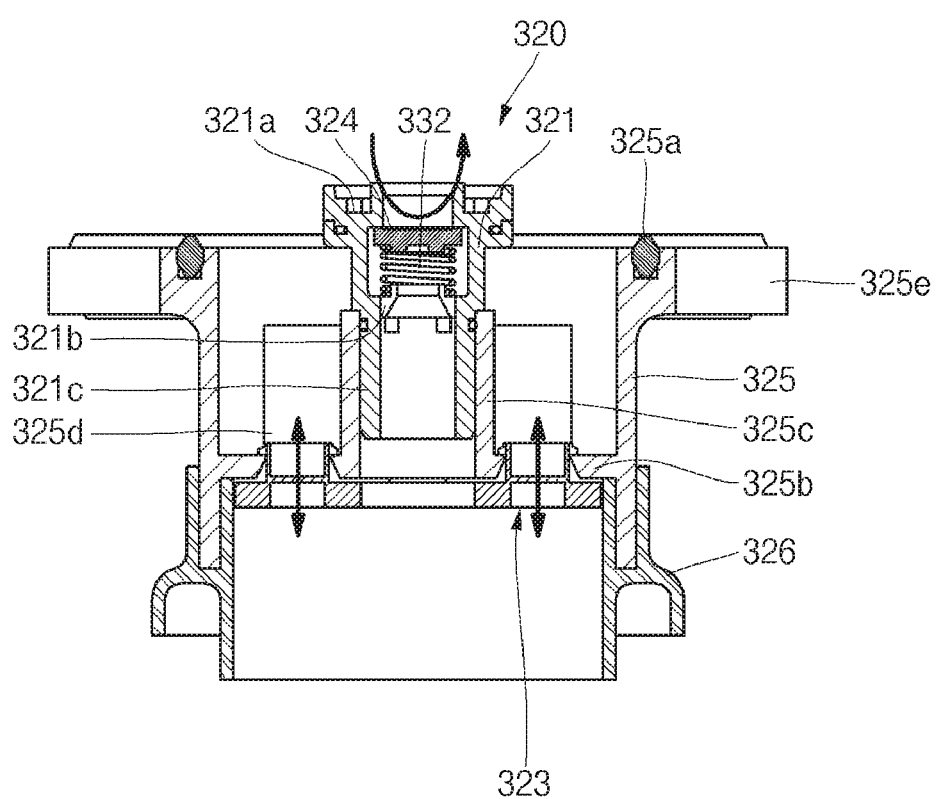
FIGS. 6A and 6B are cross-sectional views illustrating operations of an ambient pressure equalization device and an extreme pressure equalization device of the battery pack according to still another embodiment of the present invention.
Figure 6B:
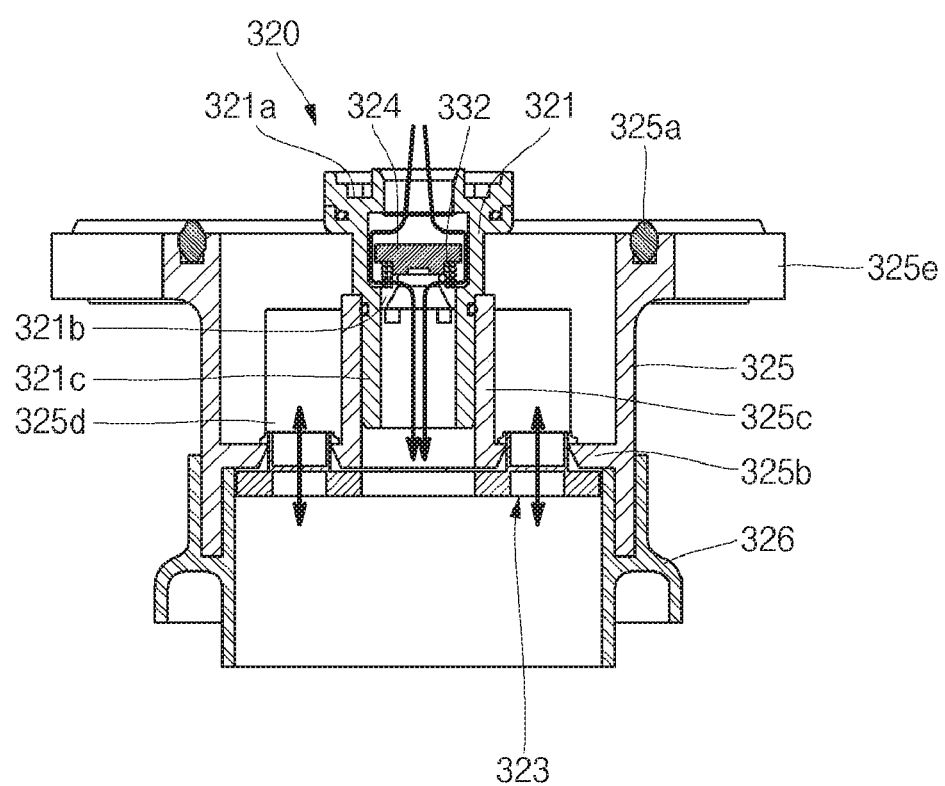

Referring to FIGS. 6A and 6B, operations of an ambient pressure equalization device and an extreme pressure equalization device of a battery pack according to still another embodiment of the present invention are illustrated.

As illustrated in FIG. 6A, when the variation in the internal pressure of the housing 110 is smaller than the reference pressure variation, the first pressure equalization member 323 installed in the connection plate 325b of the outer body 325 equalizes the internal and external pressures of the housing 110. In other words, while the first pressure equalization member 323 closes the throughhole 111 of the housing 110, the air can permeate through the first pressure equalization member 323, thereby equalizing the internal and external pressures of the housing 110.

As illustrated in FIG. 6B, when the variation in the internal pressure of the housing 110 is greater than the reference pressure variation, the second pressure equalization member 324 separately formed from the first pressure equalization member 323 equalizes the internal and external pressures of the housing 110. In other words, the second pressure equalization member 324 separately formed from the first pressure equalization member 323 downwardly moves while compressing the elastic member 322 by the internal pressure of the housing 110, thereby opening the throughhole 111 of the housing 110. Therefore, the excessively high pressure and gases generated in the housing 110 are rapidly released to the outside through the throughhole 111.

As described above, the pressure equalization device 320 of the battery pack according to the present invention includes the first pressure equalization member 323 and the second pressure equalization member 324 separately installed from each other, and the first pressure equalization member 323 includes a plurality of first pressure equalization members, thereby rapidly equalizing the internal pressure of the housing 110 and the external pressure of the vehicle under a low pressure.

The pressure equalization device 320 of the battery pack according to an embodiment of the present invention is implemented as a single device consisting of the first pressure equalization member 323 and the second pressure equalization member 324, thereby dealing with both a low pressure and a high pressure. In other words, the low pressure is dealt with the first pressure equalization member 323 and the high pressure is dealt with the second pressure equalization member 324.

While the battery pack of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack comprising:
    a housing accommodating a battery cell and having a throughhole; and
    a pressure equalization device coupled to the throughhole and equalizing internal and external pressures of the housing, wherein the pressure equalization device comprises:
        a first pressure equalization member located within the housing in the throughhole and configured to equalize the internal and external pressures of the housing when a variation in the internal pressure of the housing is smaller than a reference pressure variation; and
        a second pressure equalization member located within the housing in the throughhole and configured to equalize the internal and external pressures of the housing when the variation in the internal pressure of the housing is greater than the reference pressure variation, wherein the throughhole passes in a first direction from an interior of the housing to an outer surface of the housing, wherein the pressure equalization device is configured to release a first amount of pressure from inside the housing along a first path through the first pressure equalization member made of an air permeable material to an exterior of the housing and an exterior of the second pressure equalization member when the variation in the internal pressure of the housing is smaller than the reference pressure variation, and is configured to release a second amount of pressure greater than the first amount of pressure along both the first path and a second path that is spaced apart from the first path when the variation in the internal pressure of the housing is greater than the reference pressure variation, wherein the pressure equalization device comprises an inner body connected to the throughhole and accommodating the first and second pressure equalization members, wherein the second pressure equalization member defines an annular outer portion, wherein the first pressure equalization member and the second pressure equalization member are integrally formed with each other, and wherein the pressure equalization device is entirely located within the housing.

2. The battery pack of claim 1, wherein the pressure equalization device comprises:

an elastic member positioned inside the inner body, wherein the first pressure equalization member is located between the inner body and the elastic member, and wherein the second pressure equalization member extends from the first pressure equalization member to be coupled to the elastic member.

3. The battery pack of claim 2, wherein the first pressure equalization member is configured to close the throughhole when the variation in the internal pressure of the housing is smaller than the reference pressure variation, and wherein the second pressure equalization member is configured to open the throughhole when the variation in the internal pressure of the housing is greater than the reference pressure variation.

4. The battery pack of claim 2, wherein the inner body is coupled to an outer body.

5. A battery pack comprising:

a housing accommodating a battery cell and having a throughhole; and a pressure equalization device coupled to the throughhole and equalizing internal and external pressures of the housing, wherein the pressure equalization device comprises:

a first pressure equalization member located within the housing and configured to equalize the internal and external pressures of the housing when a variation in the internal pressure of the housing is smaller than a reference pressure variation; and a second pressure equalization member located within the housing and configured to equalize the internal and external pressures of the housing when the variation in the internal pressure of the housing is greater than the reference pressure variation, wherein the pressure equalization device is configured to release a first amount of pressure from inside the housing along a first path through the first pressure equalization member made of an air permeable material to an exterior of the housing and an exterior of the second pressure equalization member when the variation in the internal pressure of the housing is smaller than the reference pressure variation, and is configured to release a second amount of pressure greater than the first amount of pressure along both the first path and a second path that is spaced apart from the first path when the variation in the internal pressure of the housing is greater than the reference pressure variation, wherein the first pressure equalization member and the second pressure equalization member are separately formed and spaced apart from each other, and wherein the throughhole passes in an outward direction from an interior of the housing to an exterior of the housing, and the first pressure equalization member is spaced apart from the second pressure equalization member in the outward direction.

6. The battery pack of claim 5, wherein the pressure equalization device includes an outer body, a connection plate extending to an inside of the outer body, and an upper protrusion upwardly extending from the connection plate and connected to the throughhole, wherein the first pressure equalization member is coupled to the connection plate, and wherein the second pressure equalization member is coupled to the upper protrusion.

7. The battery pack of claim 6, further comprising:

an inner body coupled to the upper protrusion and connected to the throughhole; and an elastic member positioned inside the inner body, wherein the second pressure equalization member is coupled between the inner body and the elastic member.

8. The battery pack of claim 7, wherein the first and second pressure equalization members are configured to close the throughhole when the variation in the internal pressure of the housing is smaller than the reference pressure variation, and wherein the second pressure equalization member is configured to open the throughhole when the variation in the internal pressure of the housing is greater than the reference pressure variation.

9. The battery pack of claim 1, wherein the pressure equalization device is spaced inwardly from the outer surface of the housing.

10. A battery pack comprising:

a housing accommodating a battery cell and having a throughhole; and a pressure equalization device coupled to the throughhole and equalizing internal and external pressures of the housing, wherein the pressure equalization device comprises:

a first pressure equalization member located within the housing and configured to equalize the internal and external pressures of the housing when a variation in the internal pressure of the housing is smaller than a reference pressure variation; and a second pressure equalization member located within the housing and configured to equalize the internal and external pressures of the housing when the variation in the internal pressure of the housing is greater than the reference pressure variation, wherein the pressure equalization device is configured to release pressure from inside the housing through the first pressure equalization member made of an air permeable material to an exterior of the housing and an exterior of the second pressure equalization member when the variation in the internal pressure of the housing is smaller than the reference pressure variation, wherein the first pressure equalization member and the second pressure equalization member are separately formed from each other, and wherein the throughhole passes in an outward direction from an interior of the housing to an exterior of the housing, and the first pressure equalization member is spaced apart from the second pressure equalization member in a direction perpendicular to the outward direction.

* * * * *